(12) United States Patent
Barraci et al.

(10) Patent No.: US 10,096,002 B2
(45) Date of Patent: Oct. 9, 2018

(54) TIME ZONE SENSITIVE CALENDAR

(71) Applicant: The Boeing Company, Chicago, IL (US)

(72) Inventors: Nima Barraci, Moerfelder Landstrasse (DE); Andreas Sindlinger, Wintergrasse (DE)

(73) Assignee: The Boeing Company, Chicago, IL (US)

( * ) Notice: Subject to any disclaimer, the term of this patent is extended or adjusted under 35 U.S.C. 154(b) by 700 days.

(21) Appl. No.: 14/252,095

(22) Filed: Apr. 14, 2014

(65) Prior Publication Data
US 2015/0294273 A1 Oct. 15, 2015

(51) Int. Cl.
*G06Q 10/00* (2012.01)
*G06Q 10/10* (2012.01)
*G04G 9/00* (2006.01)

(52) U.S. Cl.
CPC ....... *G06Q 10/1093* (2013.01); *G04G 9/0076* (2013.01); *G06Q 10/109* (2013.01)

(58) Field of Classification Search
CPC .......................................... G06Q 10/00–50/00
USPC ................................. 705/7.11–7.42
See application file for complete search history.

(56) References Cited

U.S. PATENT DOCUMENTS

| | | | | |
|---|---|---|---|---|
| 4,549,047 A * | 10/1985 | Brian | .................... | H04M 3/533 379/88.22 |
| 4,819,191 A * | 4/1989 | Scully | .................... | G04G 11/00 715/751 |
| 5,845,257 A * | 12/1998 | Fu | .................... | G06F 15/0266 368/21 |
| 5,867,822 A * | 2/1999 | Sankar | .................... | G06F 1/14 705/7.12 |
| 5,960,406 A * | 9/1999 | Rasansky | .................... | G06Q 10/1093 705/7.18 |
| 6,016,478 A * | 1/2000 | Zhang | .................... | G06Q 10/06314 705/7.19 |
| 6,198,696 B1 * | 3/2001 | Korpi | .................... | A63B 23/03575 368/21 |
| 6,219,307 B1 * | 4/2001 | Chitturi | .................... | G04B 19/207 368/21 |

(Continued)

FOREIGN PATENT DOCUMENTS

WO WO 2014186827 A1 * 11/2014 ........... G06Q 10/109

OTHER PUBLICATIONS

Tang, John C., et al. "Your time zone or mine?: a study of globally time zone-shifted collaboration." Proceedings of the ACM 2011 conference on Computer supported cooperative work. ACM, 2011. (Year: 2011).*

(Continued)

*Primary Examiner* — Alan S Miller
(74) *Attorney, Agent, or Firm* — Miller, Matthias & Hull LLP

(57) ABSTRACT

Methods, computer-readable storage mediums and systems provide for displaying a time zone sensitive calendar. According to aspects of the disclosure, information is accessed that is associated with the time zone sensitive calendar. The information is used in determining the different time zones to include in a calendar view. Each of the different time periods in the calendar view are associated with one of the time zones. The calendar view for the time zone sensitive calendar is then displayed.

17 Claims, 9 Drawing Sheets

(56) References Cited

U.S. PATENT DOCUMENTS

| | | | | |
|---|---|---|---|---|
| 6,249,486 B1* | 6/2001 | Chitturi | G04B 19/207 | 368/21 |
| 6,266,295 B1* | 7/2001 | Parker | G06Q 10/109 | 368/28 |
| 6,295,541 B1* | 9/2001 | Bodnar | G06F 17/30353 | |
| 6,370,566 B2* | 4/2002 | Discolo | G06F 15/0225 | 709/201 |
| 6,647,370 B1* | 11/2003 | Fu | G06F 15/0266 | 705/7.19 |
| 6,831,970 B1* | 12/2004 | Awada | H04M 3/42178 | 379/201.01 |
| 6,950,662 B2* | 9/2005 | Kumar | G06Q 10/109 | 370/311 |
| 7,082,402 B2* | 7/2006 | Conmy | G06F 17/211 | 705/7.13 |
| 7,188,073 B1* | 3/2007 | Tam | G06Q 10/02 | 705/5 |
| 7,219,109 B1* | 5/2007 | Lapuyade | G06Q 10/109 | 707/752 |
| 7,774,224 B2* | 8/2010 | Xiao | G06Q 10/06314 | 705/7.18 |
| 7,856,483 B2* | 12/2010 | Fitzpatrick | G06Q 10/109 | 709/204 |
| 8,607,250 B2* | 12/2013 | Oral | G06Q 10/109 | 705/7.13 |
| 8,655,714 B2* | 2/2014 | Weir | G06Q 10/109 | 705/7.18 |
| 9,438,649 B2* | 9/2016 | Tallett | H04L 65/403 | |
| 2001/0014866 A1* | 8/2001 | Conmy | G06F 17/211 | 705/7.19 |
| 2001/0014867 A1* | 8/2001 | Conmy | G06F 17/211 | 705/7.18 |
| 2002/0038234 A1* | 3/2002 | Fu | G06F 15/0266 | 705/7.19 |
| 2003/0009411 A1* | 1/2003 | Ram | G06Q 40/06 | 705/37 |
| 2003/0054325 A1* | 3/2003 | Miller | G09B 19/18 | 434/108 |
| 2003/0204474 A1* | 10/2003 | Capek | G06Q 10/109 | 705/64 |
| 2005/0021636 A1* | 1/2005 | Kumar | G06Q 10/107 | 709/206 |
| 2005/0114191 A1* | 5/2005 | Atkin | G06Q 10/1095 | 705/7.19 |
| 2006/0129626 A1* | 6/2006 | Fitzpatrick | G06Q 10/109 | 709/200 |
| 2006/0136121 A1* | 6/2006 | Eisen | G06Q 10/109 | 701/532 |
| 2006/0241998 A1* | 10/2006 | Rokosz | G06Q 10/06311 | 705/7.13 |
| 2007/0089071 A1* | 4/2007 | Zinn | G06F 8/38 | 715/844 |
| 2007/0185752 A1* | 8/2007 | Curran | G06Q 10/109 | 715/764 |
| 2007/0186193 A1* | 8/2007 | Curran | G06Q 10/109 | 715/780 |
| 2008/0177584 A1* | 7/2008 | Altaf | G06Q 10/02 | 705/5 |
| 2009/0077570 A1* | 3/2009 | Oral | H04L 67/10 | 719/318 |
| 2009/0168609 A1* | 7/2009 | Weir | G06Q 10/109 | 368/21 |
| 2010/0162105 A1* | 6/2010 | Beebe | G06Q 10/1093 | 715/273 |
| 2010/0174998 A1* | 7/2010 | Lazarus | G06Q 10/109 | 715/751 |
| 2010/0214878 A1* | 8/2010 | Wood | G04G 11/00 | 368/21 |
| 2012/0150581 A1* | 6/2012 | McPhail | G06Q 10/10 | 705/7.19 |
| 2015/0268839 A1* | 9/2015 | Tallett | G06Q 10/109 | 715/745 |
| 2016/0104119 A1* | 4/2016 | Von Hessberg | G06Q 10/109 | 455/456.3 |
| 2016/0366245 A1* | 12/2016 | Gupta | G06Q 10/10 | |
| 2016/0370985 A1* | 12/2016 | Tallett | H04L 65/403 | |

OTHER PUBLICATIONS

Luz, Saturnino, and Masood Masoodian. "Improving focus and context awareness in interactive visualization of time lines." Proceedings of the 24th BCS Interaction Specialist Group Conference. British Computer Society, 2010. (Year: 2010).*

Extended European Search Report dated Jul. 17, 2015 from EP Application No. 15163424.3.

* cited by examiner

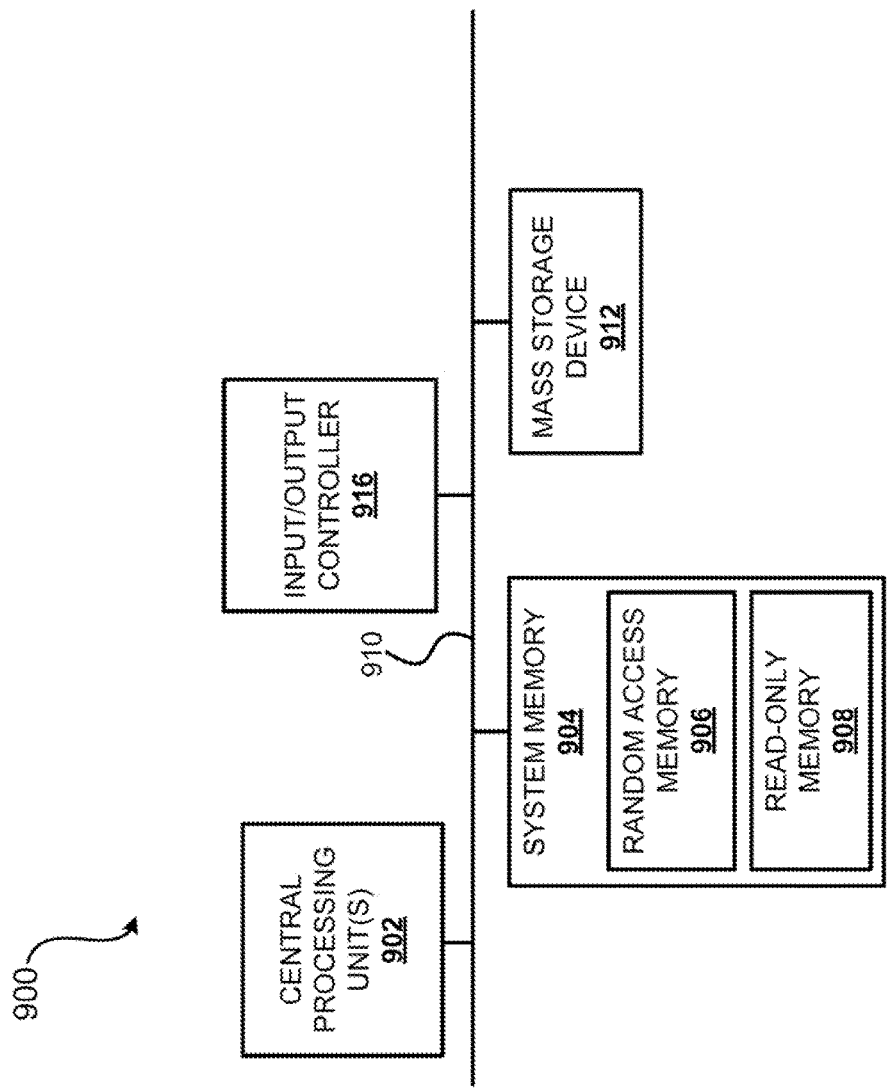

TIME ZONE SENSITIVE CALENDAR

BACKGROUND

Electronic calendars are commonly used to keep track of and schedule different events. For example, a user may schedule all of their meetings using an electronic calendar. Many calendars include an option for changing the time zone used to display events. For example, a user may change the time zone of their calendar when they travel to a different time zone. After changing to the new time zone, all of the events within the calendar view are displayed according to the selected time zone. For example, if the user changes the time zone from Central Standard Time (CST) to Pacific Standard Time (PST), all of the events in the calendar are shown as starting two hours earlier. When the user changes the time zone back to CST, all of the events in the calendar view are shown as starting two hours later as compared to the times of the events when displayed in PST.

Some calendars may allow a user to display two time scales. A first time scale shows the time according to a first time zone and a second time scale shows the time according to the second time zone. For example, if a PST time scale and a CST time scale are displayed, the PST time scale shows 1 PM and the CST time scale shows 3 PM directly next to PST time scale (e.g., 1:00|3:00). The user may refer to the time scale to see what time an event is scheduled for in each of the different time zones. For example, they may see that an event starts at either 1 PM or 3 PM depending on the time zone.

Selecting and navigating between different time zones when viewing a calendar can be challenging. For example, it is very easy for a user to become confused when creating and viewing appointments across different time zones. For example, when viewing the appointments across the different time zones, the user either switches the calendar view to a different time zone or performs a conversion to determine the time difference of the events that occur in the other time zones.

SUMMARY

It should be appreciated that this Summary is provided to introduce a selection of concepts in a simplified form that are further described below in the Detailed Description. This Summary is not intended to be used to limit the scope of the claimed subject matter.

Methods, computer-readable storage medium, and apparatus described herein are directed at displaying a time zone sensitive calendar. According to an aspect, a method is provided for displaying a time zone sensitive calendar. Information is accessed that is associated with the time zone sensitive calendar. The information is used in determining the different time zones to include in a calendar view. Each of the different time periods in the calendar view are associated with one of the time zones. The calendar view is displayed such that the time periods that are associated with different time zones are visually distinguishable from each other.

According to another aspect, a computer-readable storage medium is provided for displaying a time zone sensitive calendar. Information that includes appointments and travel events is accessed that is associated with the time zone sensitive calendar. The information is used in determining the different time zones to include in a calendar view. Each of the different time periods in the calendar view are associated with one of the time zones. Events that are within each of the time periods are associated with the different time zones. The calendar view is displayed such that the time periods that are associated with different time zones are visually distinguishable from each other.

According to yet another aspect, a system is provided for displaying a time zone sensitive calendar. The system includes a display and a processor. The processor is used to determine the time zones to display in a calendar view of the time zone sensitive calendar. The time zones are determined based on travel events within the calendar that change from one time zone to another time zone. Each of the different time periods in the calendar view are associated with one of the time zones. Events that are within each of the time periods are associated with the different time zones. The calendar view is then displayed. The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2 illustrates a calendar view for a time zone sensitive calendar that includes virtual travel events;

FIG. 4 shows two calendar views illustrating changing a recurring event to reflect a different time zone;

FIG. 5 shows two calendar views for a time zone sensitive calendar;

FIG. 9 illustrates a computer in which a display for a time zone sensitive calendar according to various embodiments presented herein.

DETAILED DESCRIPTION

Figure 1:
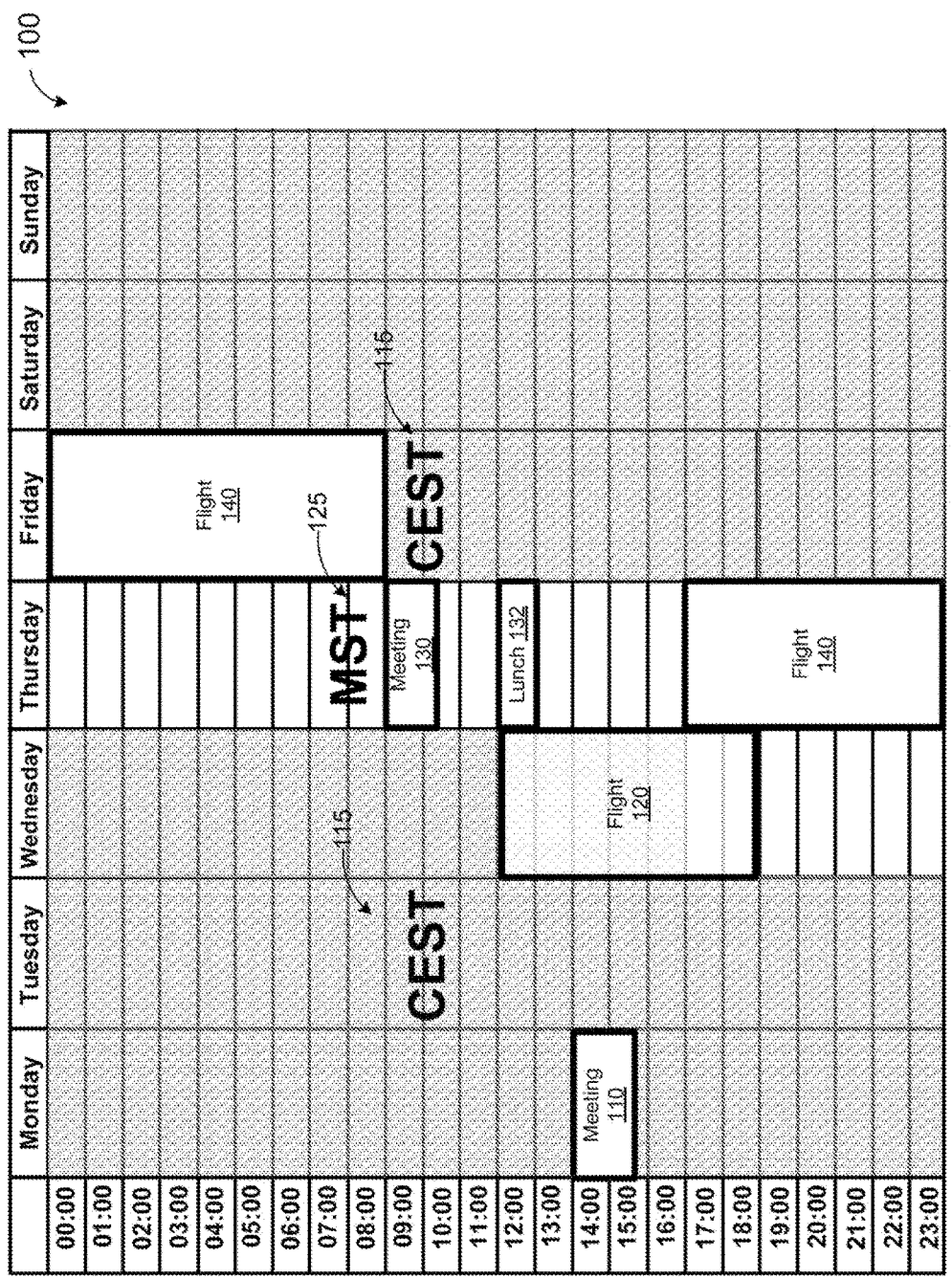
FIG. 1 illustrates a calendar view for a time zone sensitive calendar.

The following detailed description is directed to displaying a time zone sensitive calendar. Utilizing the concepts and technologies described herein, a time zone sensitive calendar displays a calendar view such that events are displayed according to their associated time zone. For example, a user may be located in their home time zone for a first time period of the week and in a different time zone during a second time period of the week. In a weekly calendar view using the scenario above, events that occur Monday and Tuesday are displayed according to the user's home time zone and events that occur Wednesday through Sunday are displayed according to the different time zone during this period. According to an embodiment, the different time periods that are associated with the different time periods are displayed using different formatting such that they are visually distinguishable from each other.

Generally, travel events, or other information that indicates a user will be located in a different time zone, are used to determine when to change the display of the calendar view to reflect a different time zone. For example, when a travel event is determined (e.g., a flight that results in changing time zones), the time zone sensitive calendar updates the part of the calendar view which represents the different time zone to reflect the new time zone that is associated with a different time zone. Before a user travels to a different time zone, the events in the time zone sensitive calendar are shown according to the user's current time zone and when the user is indicated to be in a new time zone, the events are shown according to the new time zone. In other words, the times of each event in the calendar view may be shown according to the time zone where the user will be located, when the event happens.

Looking at the same calendar view, a user can see that today they are in their home time zone, tomorrow they will be located in a different time zone, and in three days they will return home. Instead of having to view a calendar using a single time zone, or having to translate the time differences between different time zones, the different time periods are visually distinguishable to reflect the different time zone.

In addition to the displaying the events in the different time zone, travel events may also be shown in a calendar view of the time zone sensitive calendar. For example, an event may be shown in the calendar view that shows a flight, or some other form of travel, from one time zone to another. As discussed, the formatting of the time period before the user travels may be different as compared to the formatting of the time period after the user completes their travel to the different time zone.

Travel duration indicators may also be displayed to illustrate when time is being compressed during the travel event or expanded during the travel event. For example, a travel duration indicator may be displayed for a flight that takes four hours to complete even though the flight appeared to only take two hours when viewing the time from the calendar view (e.g., took off at 5 PM and landed at 7 PM). For the return flight, a travel duration indicator may be displayed to show that the return flight took four hours even though the flight appeared to take size hours when viewing the time from the calendar view (e.g., took off at 5 PM and landed at 11 PM).

In the following detailed description, references are made to the accompanying drawings that form a part hereof, and which are shown by way of illustration, specific embodiments, or examples. Referring now to the drawings, in which like numerals represent like elements through the several figures, a configurable tray table and method for employing the same according to the various embodiments will be described.

Referring now to FIG. 1, a calendar view for a time zone sensitive calendar is illustrated. As shown, calendar view 100 displays a week of time that reflects two different time zones. Other time periods may be configured to be displayed in a calendar view. For example, the calendar view may display a day, a week, a month, or some other time period.

As briefly discussed above, a calendar view, such as calendar view 100, displays events during different time periods in the calendar view to reflect the time zone in which the user will be located in during that time period. Calendar view 100 shows three different time periods that are associated with two different time zones. The first time period in calendar view 100 starts at 00:00 on Monday and ends at 12:00 on Wednesday. The second time period starts at 19:00 on Wednesday and ends at to 17:00 on Thursday. The third time period starts at 09:00 on Friday and ends at the end of Sunday. The first time period is associated with the Central European Summer Time (CEST) 115. The second time period is associated with Mountain Standard Time (MST) 125 and the third time period is associated with CEST 115.

In the current example, the first time period and the third time period are displayed using a dotted pattern fill and the second time period are displayed with no fill. As discussed herein, many other types of formatting may be applied to the different time periods such that they are visually distinguishable from each other. For example, each time period may be associated with a particular color (e.g., green for CEST, blue for MST) and/or some other formatting may be used to reflect the different time zones. For example, the text within the different time periods may be displayed using different fonts, different types of lines may be placed around the time periods, and the like. According to an embodiment, a user may configure the formatting for the different time periods as well as whether or not to use different formatting for the different time periods. Alternatively, the formatting for the different time periods may be predetermined.

For purposes of illustration, assume that the user that is associated with the time zone sensitive calendar is currently located in CEST 115 and it is Monday at 09:00. As can be seen, calendar view 100 clearly shows the different time zones and the events that will occur while the user is located in those time zones. The different time periods may be associated with the time zones using different methods. For example, a user may manually input the times when they will be in a certain location (e.g., MST 125, CEST 115). The different time periods may also be associated with the time zones automatically.

For example, in response to determining a travel event, such as flight 120 or flight 140, within calendar view 100 that starts in one time zone and ends in a different time zone, the different time periods in calendar view 100 are automatically determined. Other information may also be used in determining when a user will be in a different time zone. For example, the information used in determining when a user will be in a different time zone may include but is not limited to, event information (e.g., time zone, location information for non-virtual meetings), movement information (e.g., Global Positioning System "GPS" information or some other sensor information), manual input, and the like.

Each event that is within one of the different time periods may be displayed according to the assumed time zone, the user will be in. For example, meeting 110 is displayed according to CEST 115 and meeting 130 and lunch 132 are displayed according to MST. Referring to calendar view 100 it can be readily determined that the user will be in a CEST 115 time zone until they travel on flight 120. The user remains in MST 125 until they take off on flight 140. Once the user lands, calendar view 100 shows that the user is back to CEST 115. More details regarding associating different time zones with different time periods and events are described below.

Figure 2:
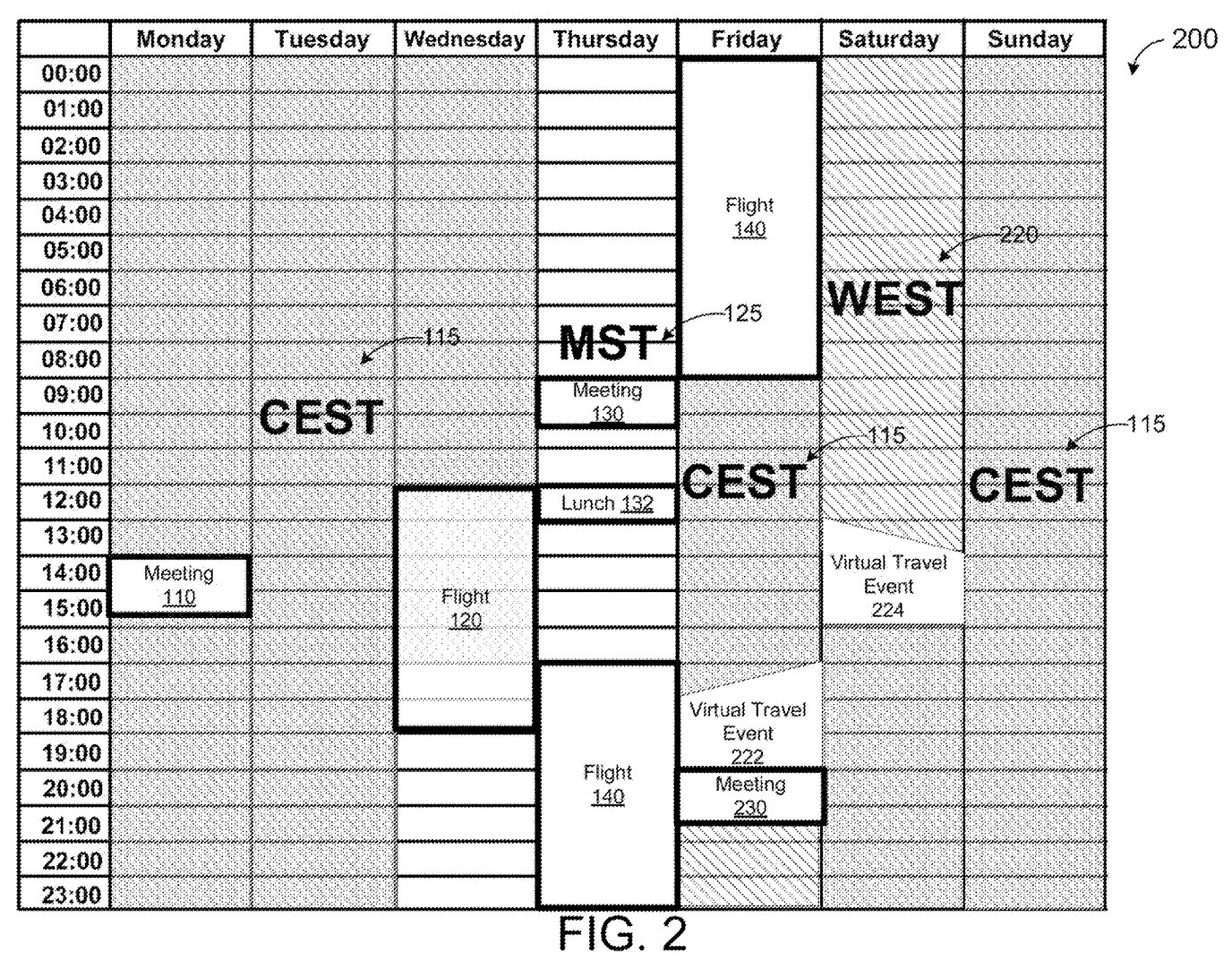

FIG. 2 illustrates a calendar view for a time zone sensitive calendar that includes virtual travel events. Calendar view 200 is similar to calendar view 100 that is shown in FIG. 1 but includes virtual travel event 222, virtual travel event 224, Western European Summer Time (WEST) 220 and different time periods.

As discussed above, a calendar view, such as calendar view 200, may display time periods in the calendar view to reflect time zones indicating where the user will be located during the time displayed in the calendar view. In the current example, calendar view 200 shows five different time periods. The first time period and the second time period that are displayed in calendar view 200 are the same as illustrated in calendar view 100 as shown in FIG. 1. The third time period in calendar view 200 starts at the end of flight 140 and ends at virtual travel event 222. The fourth time period starts at virtual travel event 222 and ends at virtual travel event 224. The fifth time period starts at virtual travel event 224 and ends at the end of Sunday. The first time period is associated with CEST 115. The second time period is associated with MST 125. The third time period is associated with CEST 115. The fourth time period is associated with WEST 220 and the fifth time period is associated with CEST 115.

In the current example, virtual travel event 222 and virtual travel event 224 have been created. According to an embodiment, a virtual travel event is automatically added to the time zone sensitive calendar when an event is indicated to be in a different time zone but there are not any travel events indicating travel from one time zone to the time zone where the event is located. A virtual travel event may or may not be displayed in a calendar view. For example, see FIG. 3 for a calendar view where virtual travel events are not depicted. As illustrated in FIG. 2, meeting 230 is indicated to be in the WEST 220 time zone. There is a one hour time difference between CEST 115 and WEST 220. A diagonal line, or some other indicator, may be displayed on the time zone sensitive calendar to indicate a division between two different time zones.

For example, the diagonal line at the top of virtual travel event 222 shows that meeting 230 either starts at 18:00 CEST or at 17:00 WEST. In some cases, a diagonal line may be displayed without the display of a virtual travel event (See FIG. 3). Virtual travel event 222 provides the user viewing calendar view 200 with an indication that the meeting is in a different time zone.

Calendar view 200 may be updated to reflect when the user travels to a new time zone automatically or manually. For example, the time zone may automatically change based on a detected time zone change (e.g., using GPS) or when a user selects an option indicating that they are located in the time zone of meeting 230. According to an embodiment, the diagonal line changes to a horizontal line when the time zone change to the meeting is detected.

Similar to virtual travel event 222, virtual travel event 224 shows changing back to CEST 115 in response to the user being indicated to be in the CEST 115 time zone. For example, the smart phone or computing device that is associated with the user may determine that the time zone changed from WEST 220 to CEST 115. Other methods may be used to determine when a user is located in a different time zone. As discussed herein, the time of events are adjusted to reflect the time zone where the user is indicated to be located in during the time period.

Figure 3:
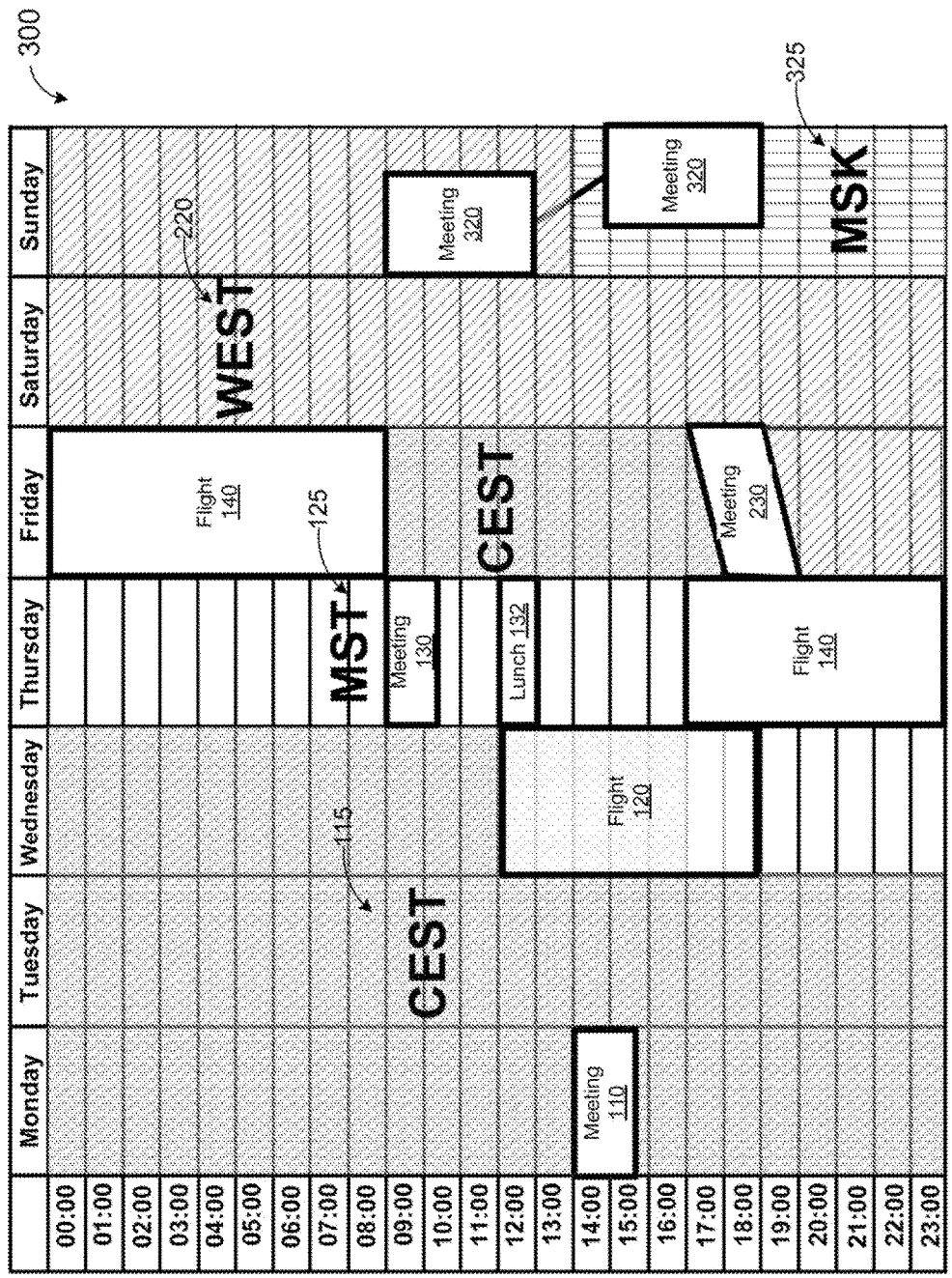
FIG. 3 illustrates a calendar view for a time zone sensitive calendar that includes the same event displayed in two different time zones.

FIG. 3 illustrates a calendar view for a time zone sensitive calendar that includes the same event displayed in two different time zones. Calendar view 300 is similar to calendar view 200 that is shown in FIG. 2 but shows a display of the same event in two different time zones without displaying a virtual travel event. Calendar view 300 also includes Moscow Standard Time (MSK) 325, a meeting 320 and different time periods.

In the current example, calendar view 300 shows five different time periods. The first time period, the second time period and the third time period that are displayed in calendar view 300 are the same as illustrated in calendar view 200 as shown in FIG. 2. The fourth time period in calendar view 300 starts during the meeting 230 and ends at 14:00 CEST. The fifth time period starts at 14:00 CEST and ends at the end of Sunday. The first time period is associated with CEST 115. The second time period is associated with MST 125. The third time period is associated with CEST 115. The fourth time period is associated with WEST 220 and the fifth time period is associated with MSK 325.

In the current example, meeting 230 and meeting 320 is indicated to be associated with two different time zones. For meeting 230, there is a one hour time difference between CEST 115 and WEST 220. In the current illustration, a diagonal line is displayed on the time zone sensitive calendar to indicate a division between two different time zones. The diagonal line for the meeting 230 shows that meeting 230 either starts at 18:00 CEST or at 17:00 WEST.

According to an embodiment, when an event, such as meeting 320, happens to take place when a virtual travel occurs (not illustrated in FIG. 3), the event is depicted in two different time zones. The event is illustrated in the time zone before the virtual travel event and the event is also displayed in the time zone after the virtual travel event. In the current example, meeting 320 is displayed in the WEST and is also displayed in the MSK using the CEST 115 time scale. As illustrated, a diagonal line connects the same event. As discussed above, other indicators may be used to depict a same event in two different time zones.

Figure 4:
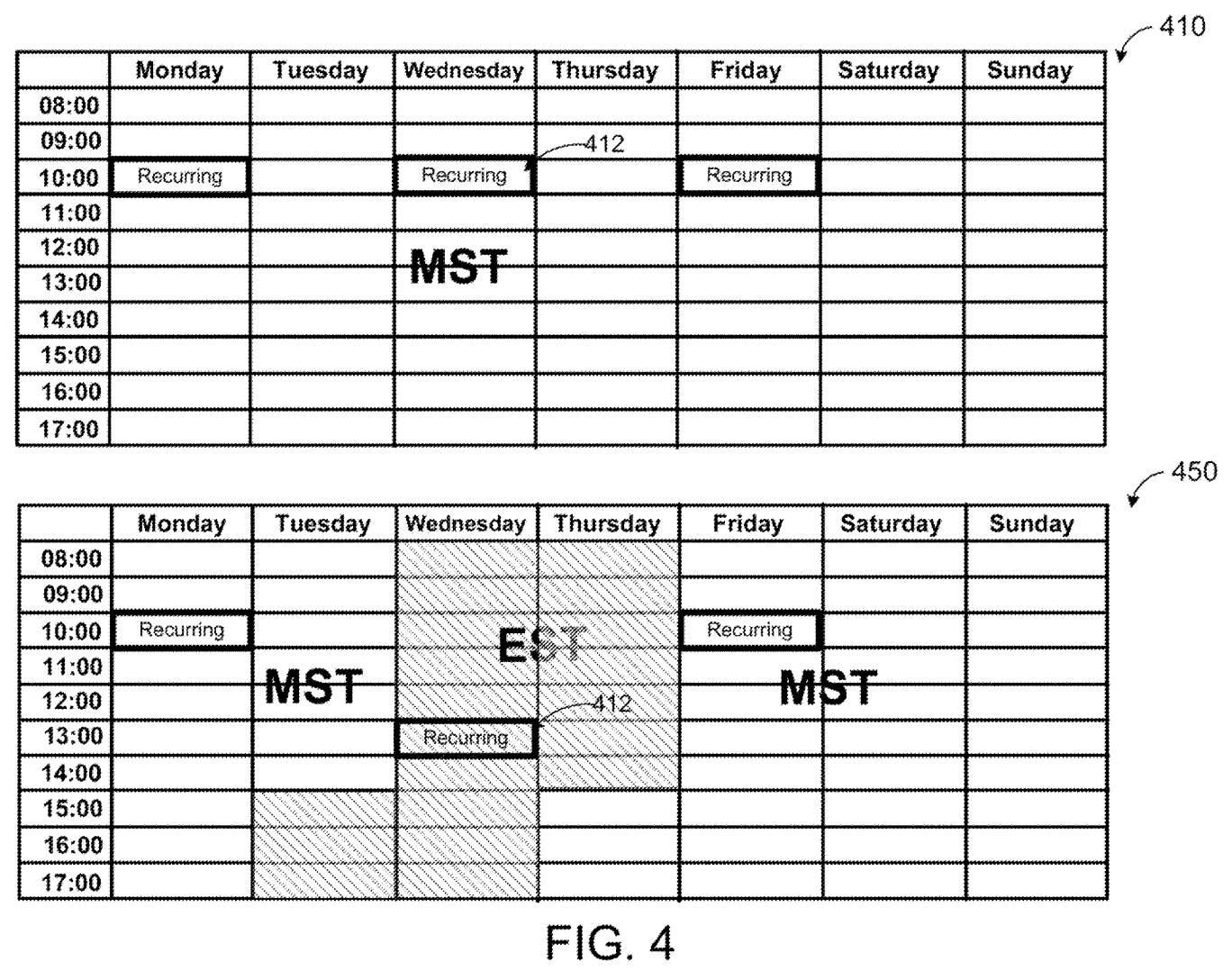

FIG. 4 shows two calendar views illustrating changing a recurring event to reflect a different time zone. Calendar view 410 illustrates a weekly time period where the user is indicated to be within the same MST time zone during the entire week. Calendar view 450 shows the same weekly time period where the user is indicated to be located in the Eastern Standard Time (EST) time zone from Tuesday at 15:00 to Thursday at 15:00.

Calendar view 410 shows an event that recurs at 10:00 AM MST every Monday, Wednesday and Friday. In response to determining that the user will be located in the EST time zone, the time of recurring event 412 is automatically adjusted from 10:00 AM to 1 PM EST. Viewing calendar view 450, a user can readily determine that they will be located in a different time zone between Tuesday and Thursday as well as the time of any events, such as recurring event 412 that occurs while they are in the time zone.

Figure 5:
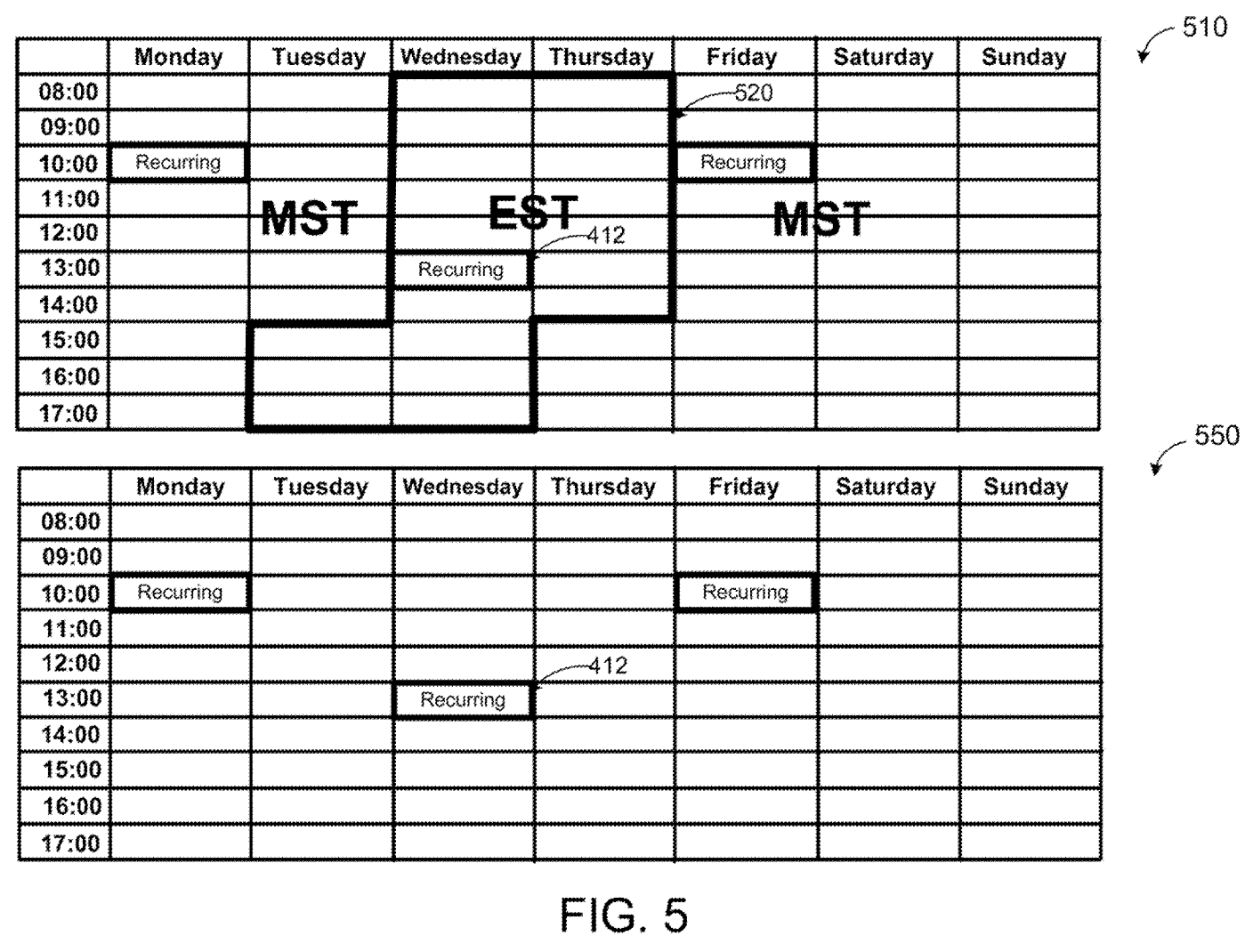

FIG. 5 shows two calendar views for a time zone sensitive calendar. Calendar view 510 and calendar view 550 are similar to calendar view 450 that is displayed in FIG. 4.

Calendar view 510 shows the time period when the user will be in the EST time zone using different formatting as compared to the formatting of calendar view 450. In the current example, outline 520 is displayed around the time period when the user is indicated to be in EST time zone. As discussed, many different types of formatting may be used to visually distinguish different time periods that are associated with different time zones.

Calendar view 550 shows the time period when the user will be in the EST time zone without using different formatting between the different time periods. According to an embodiment, a calendar view may be displayed without formatting the time periods differently. In the current example, while the time periods that are associated with the different time zones are not formatted differently, the recurring event 412 is displayed according to the EST time zone instead of the MST time zone. In addition to showing events of the time zone sensitive calendar according to the time zone where the user is indicated to be, other information may be shown to provide the user with more information relating to time zone changes.

Figure 6:
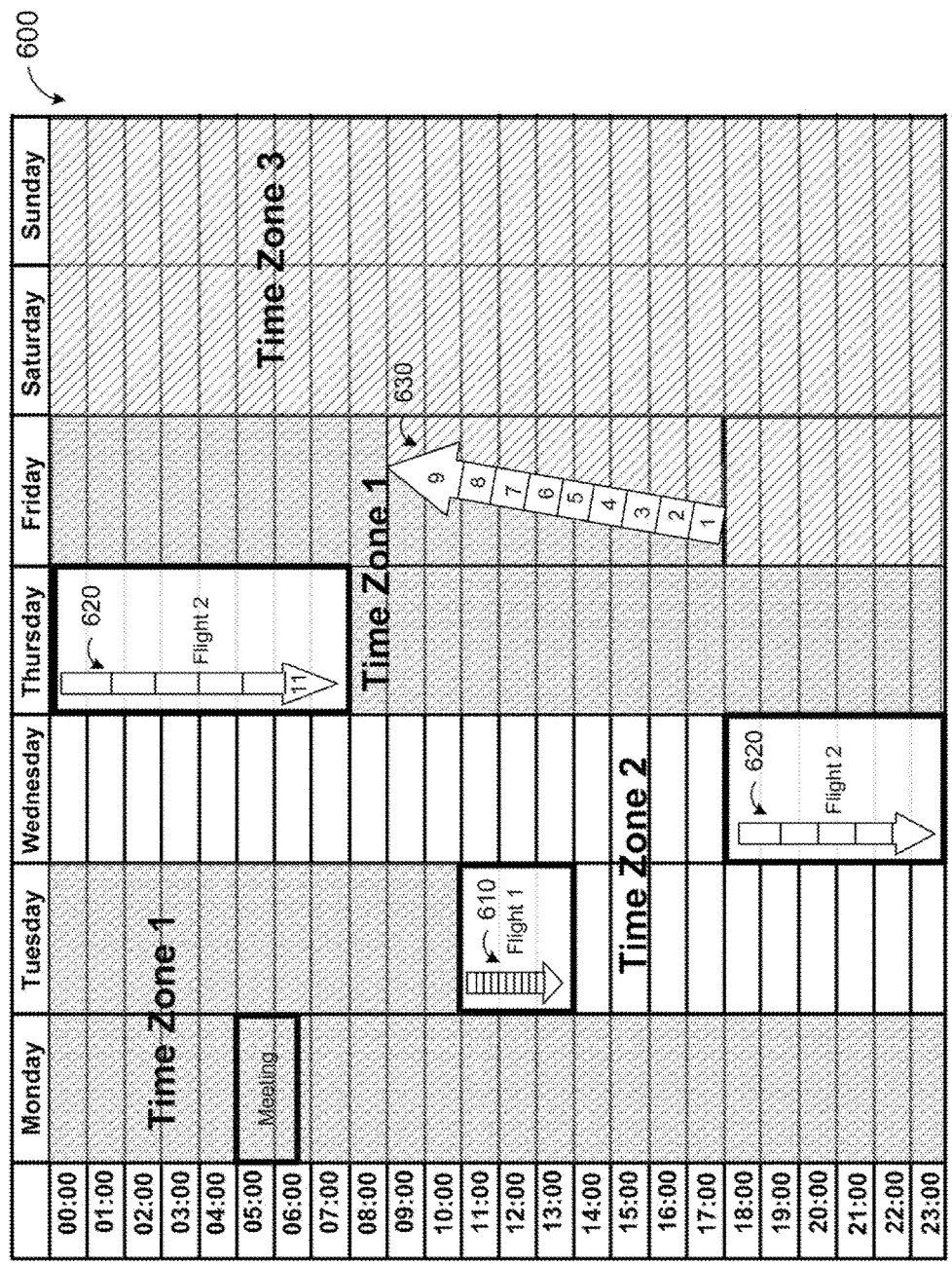
FIG. 6 shows a calendar view that illustrates travel duration indicators showing compression of time and expansion of time.

Turning now to FIG. 6, a calendar view is shown that illustrates travel duration indicators showing compression of time and expansion of time. As illustrated, calendar view 600 shows travel duration indicator 610, travel duration indicator 620, and travel duration indicator 630.

Calendar view 600 shows four different time periods that are associated with three different time zones. The first time period in calendar view 600 starts at 00:00 on Monday and ends at 11:00 on Tuesday. The second time period starts at 14:00 on Tuesday and ends at to 18:00 on Wednesday. The third time period starts at 08:00 on Thursday and ends at 18:00 on Friday. The fourth time period begins at 09:00 on Friday and ends at the end of Sunday. The first time period and the third time period is associated with Time Zone 1. The second time period is associated with Time Zone 2. The fourth time period is associated with Time Zone 3.

In the current example, the first time period and the third time period are displayed using a dotted pattern fill. The second time period is displayed with no fill and the fourth time period is filled with a diagonal line pattern. Looking at calendar view 600, a user can readily determine when they will be located in a different time zone. A user may also view a travel duration indicator to see if the actual travel time between time zones as well as whether time is being compressed or expanded during the travel event.

Travel duration indicator 610 shows that Flight 1 while only taking three hours to complete according to the time differences between Time Zone 1 and Time Zone 2 actually took 11 hours of actual travel time. Travel duration indicator 610 is divided into eleven segments to show each hour of actual travel time.

The return flight indicated by Flight 2 displays travel duration indicator 620 that shows Flight 2 took 11 hours of actual travel time even though there is a fourteen hour time span when traveling from Time Zone 2 back to Time Zone 1. Travel duration indicator 620 displays an "11" showing the actual travel time.

Travel duration indicator 630 illustrates a flight where the flight takes off at 18:00 on Friday in Time Zone 1 and arrived at 09:00 on Friday in Time Zone 3. Travel duration indicator shows a number (1-9) in each segment for displaying the actual travel time of 9 hours. While the travel duration indicators are shown as arrows, other types of travel duration indicators may be displayed. For example, the indicators may be rectangles, some other shape, textual descriptions and the like.

Figure 7:
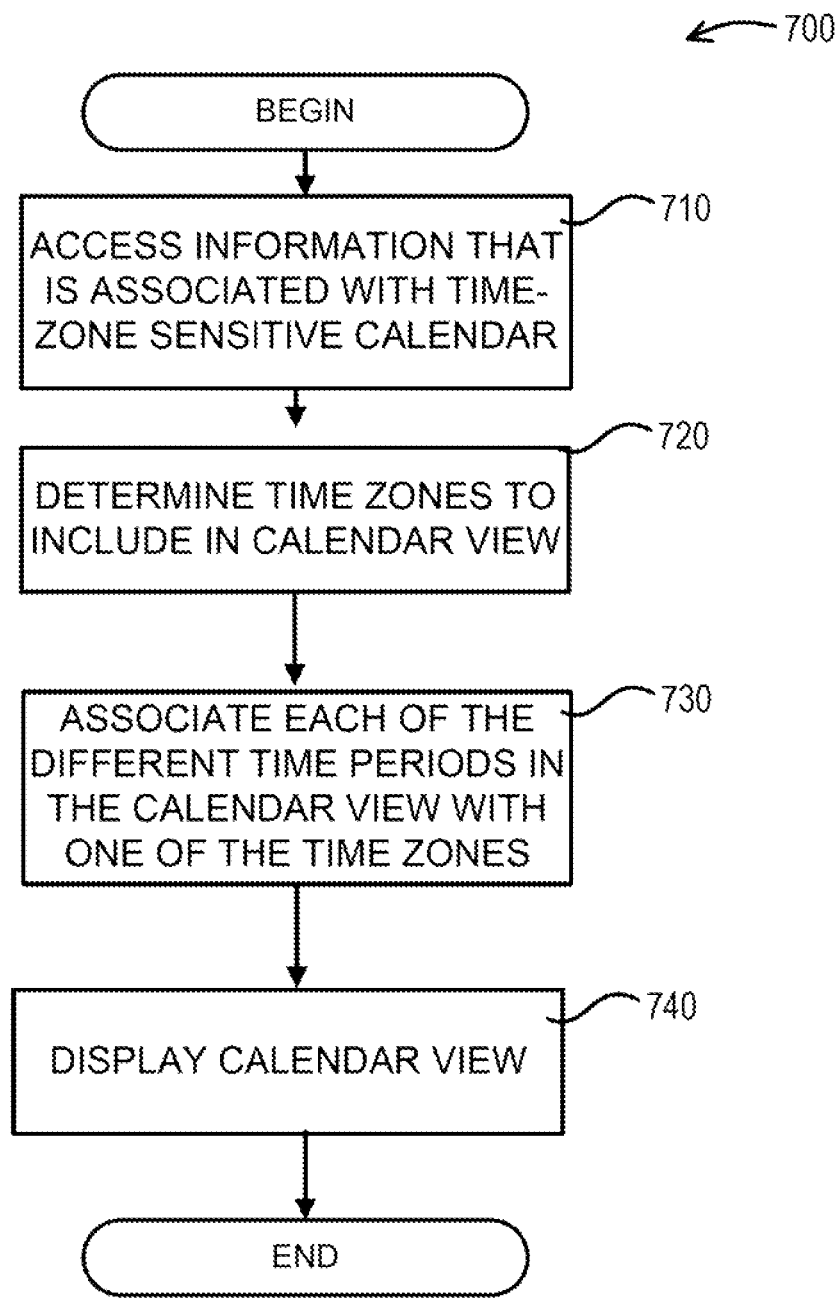
FIG. 7 illustrates a routine relating to displaying a time zone sensitive calendar.
Figure 8:
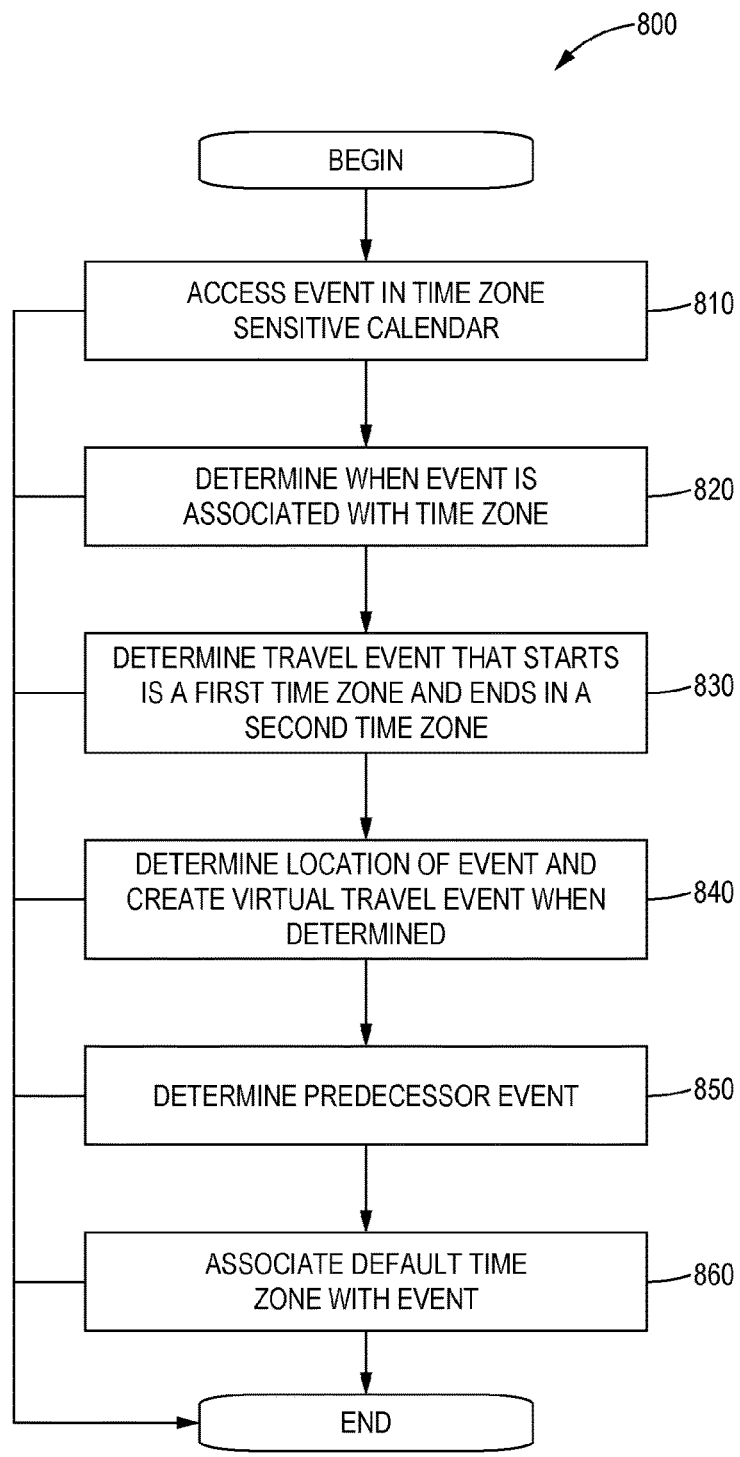
FIG. 8 shows an illustrative process for associating an event in a time zone sensitive calendar with a time zone.

Turning now to FIGS. 7 and 8, illustrative routines are described relating to a time zone sensitive calendar. It should be appreciated that more or fewer operations may be performed than shown in the figures and described herein. These operations may also be performed in a different order than those described herein.

FIG. 7 illustrates a routine relating to displaying a time zone sensitive calendar. Routine 700 begins at operation 710, where information that is associated with the time zone sensitive calendar is accessed. The information may include different types of information that may be obtained from the time zone sensitive calendar or from some other source. For example, the information may include event information such as appointment information, meeting information, time zone information, category information, importance information, time information, and the like. The information may also include information such as, but not limited to trip information (e.g., flight, train, car), car rental information, user location information, GPS (or some other sensor) information, and the like.

For example, event information may be obtained from the time zone sensitive calendar and trip information may be obtained from a travel source, such as an airline, travel website, and the like. The information may also come from one or more other calendars or data files. Generally, the information may come from any data source that includes information relating to a user's location during a period of time as well as any events that occur during a period of time within the time zone sensitive calendar.

From operation 710, routine 700 continues to operation 720, where the time zones to include in the calendar view are determined. As discussed above, the time zones to include in a calendar view are based on the determined indications of what time zones a user will be located in during the time that is displayed within the calendar view. As discussed above, the time period of the calendar view may be configured. For example, the time period may be one day, two days, one week, two weeks, one month, two months, and the like. The information that is accessed in operation 710 may indicate that the user will be located in one, two, three, four, or five or more different time zones during the time that is displayed in a calendar view of the time zone sensitive calendar. For example, one or more travel events may be determined from the information, an event in another time zone may be determined, and the like.

From operation 720, routine 700 transitions to operation 730, where the different time periods in the calendar view are associated with the different time zones determined in operation 720. For example, the calendar view is divided into different time periods based on determined times that the user will be located in each of the time zones. According to an embodiment, each event that occurs within the time period for a time zone is adjusted (if not already in that time zone) to display according to the time of the time zone. As discussed above, events may be automatically adjusted when a user is determined to be in a different time zone or is indicated to be traveling to a different time zone. FIG. 7 and the related discussion provide more details regarding associating a time zone with an event.

From operation 730, routine 700 flows to operation 740, where the time zone sensitive calendar displays the calendar view. According to an embodiment, each of the different time periods that are associated with different time zones are displayed such that they are visually distinguishable from each other. As discussed above, many different formatting methods may be used. For example, each different time zone may have a different color, pattern, text, and the like. Generally, any formatting that visually distinguishes the different time zones may be used. According to another embodiment, the different time periods are not visually distinguishable from each other. Instead, the events for each of the different time zones are adjusted to reflect the time of each of the different time zones. Routine 700 then flows to an end operation and returns to processing other actions.

FIG. 8 shows an illustrative process for associating an event in a time zone sensitive calendar with a time zone. Routine 800 begins at operation 810, where an event in the time zone sensitive calendar is accessed. The event(s) may be accessed sequentially during the time period that is displayed in the calendar view or in some other order.

From operation 810, routine 800 flows to operation 820, where a determination is made as to whether the event is associated with a time zone. For example, an event may be associated with a time zone manually when a user creates an appointment. An event may also automatically be associated with a time zone. When the event is associated with a time zone, the time zone that is associated with the event may be used as the associated time zone and routine 800 may flow to an end operation or continue to operation 830.

Flowing to operation 830, a determination is made as to whether a travel event exists. As discussed above, a travel event indicates that a user that is associated with the time zone sensitive calendar is traveling from one time zone to a different time zone. The travel event may be created from within the calendar (e.g., as an appointment) or may be determined from an external source such as a travel website or some other location. Travel events may be used to determine the different time periods in the calendar view that are associated with different time zones as well as determining what events are associated with the different time zones. When a travel event is determined, routine 800 may flow to an end operation or continue to operation 840.

Moving to operation 840, a location of the event is determined. The location of the event may be used to indicate a time zone that is associated with an event. For example, when a location of the event indicates a different time zone, then that event is associated with the different time zone. According to an embodiment, a virtual travel event may be created when a corresponding travel event is not determined in operation 830. The location may be manually set or determined from other information. For example, a user may specify "Meet with John in Denver" from which the time zone may be directly determined from the meeting information in the calendar. According to other examples, the user may specify "Meeting at Joe's Bar and Café." Other information may be accessed from within the calendar (e.g., other appointments) or from outside of the calendar. For example, a search may be performed to determine an associated location. When a location is determined, routine 800 may flow to an end operation or continue to operation 850.

Transitioning to operation 850, a determination is made as to whether there is a predecessor event. When there is a predecessor event, the time zone of the predecessor event may be associated with the event. When a predecessor event is determined, routine 800 may flow to an end operation or continue to operation 860.

Moving to operation 860, a default time zone is associated with the event. According to an embodiment, when there is not a determination for a travel event, an associated time zone, a determined location or a predecessor event, then a default time zone is associated with the event. For example, the default time zone may be set to the time zone where the user lives or works. Routine 800 flows to an end operation and returns to processing other actions. For example, routine 800 may return to operation 810 to continue processing the events in the calendar.

FIG. 9 illustrates a computer in which a time zone sensitive calendar may be displayed according to at least one embodiment disclosed herein. The computer 900 illustrated in FIG. 9 includes one or more central processing unit(s) ("CPUs") 902, a system memory 904, including a random-access memory ("RAM") 906 and a read-only memory ("ROM") 908, and a system bus 910 that couples the system memory 904 to the CPU 902. A basic input/output system containing the routines that help to transfer information between elements within the computer 900, such as during startup, may be stored in the ROM 908.

The CPUs 902 may be standard programmable processors that perform arithmetic and logical operations for the operation of the computer 900, such as the routines 700 and 800 described above. The CPUs 902 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 900 may also include a mass storage device 912. The mass storage device may be an optical disk, a magnetic storage device, or a solid state storage device. The mass storage device 912 may be operative to store one or more instructions to control a fuel cell discharge controller. In another configuration, the RAM 906, ROM 908, and the mass storage device 912 may be operative to have stored thereon, either alone or in various combinations, instructions for controlling a fuel cell discharge controller.

The computer 900 may store programs and data on the mass storage device 912 by transforming the physical state of the mass storage device 912 to reflect the information being stored. The specific transformation of physical state may depend on various factors, in different implementations of this disclosure. Examples of such factors may include, but are not limited to, the technology used to implement the mass storage device 912, whether the mass storage device 912 is characterized as primary or secondary storage, and the like.

For example, the computer 900 may store information to the mass storage device 912 by issuing instructions through a storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the mass storage device 912.

The RAM 906, the ROM 908, or the mass storage device 912 may be operative as computer-readable storage mediums. Various aspects of the present disclosure may be stored on other types of computer-readable storage mediums, such as, but not limit to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 900. It should be understood that when the claims are interpreted in light of this present disclosure, a computer-readable storage medium does not include energy in the form of waves or signals.

The computer 900 also may include an input/output controller 916 for receiving and processing input from a number of other devices, including a keyboard, mouse, or electronic stylus. Similarly, the input/output controller 916 may provide an output to a display screen, a printer, or other type of output device. One or more embodiments may include a computer-readable storage medium manufactured so that, when read by a properly configured computing device, instructions may be provided to perform operations relating to displaying and updating a time zone sensitive calendar.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for displaying a time zone sensitive calendar, comprising:
accessing user schedule information;
determining multiple time zones to include in a calendar view of the user schedule information for different time periods in the time zone sensitive calendar based on the user schedule information;
associating each time period in the calendar view with one of the multiple time zones;
displaying a travel duration indicator on the time zone sensitive calendar that indicates a compression of time or an expansion of time and indicates a duration of time that is associated with a travel event;
adding a virtual travel event to the time zone sensitive calendar when a location of an event appearing in the time zone sensitive calendar is in a different time zone than the preceding time zone in the time zone sensitive calendar but no user travel between time zones is scheduled;
determining a current time zone of a user that is associated with the time zone sensitive calendar by one or more of:
a smart phone or computing device associated with the user determines that the time zone has changed;
location information is derived from GPS (Global Positioning System) or other sensor information; and
current time zone information is entered manually;
automatically associating a current time period in the time zone sensitive calendar with the current time zone;
updating the display of the time zone sensitive calendar to reflect the current time zone; and
displaying the calendar view for the time zone sensitive calendar such that time periods associated with different time zones are visually distinct.

2. The method of claim 1, wherein displaying the calendar view for the time zone sensitive calendar such that time periods associated with different time zones are visually distinct comprises formatting each of the different time periods using at least one of a different color or a different fill pattern.

3. The method of claim 1, wherein determining the multiple time zones to include in the calendar view comprises determining a travel event from the information that starts in a first time zone and ends in a second time zone.

4. The method of claim 1, wherein associating the time periods in the calendar view with the time zones comprises determining a first time period in the calendar view to associate with one of the time zones and determining a second time period in the calendar view to associate with one of the time zones.

5. The method of claim 1, further comprising for each event that has a time within the calendar view determining a time zone to associate with the event.

6. The method of claim 1, further comprising determining when a user is indicated to be within a first time zone and determining when the user is indicated to be within a second time zone.

7. The method of claim 1, further comprising automatically adjusting a time of an occurrence of a recurring event to a first time zone when a user is indicated to be in the first time zone and adjusting the time of the occurrence of the recurring event to a second time zone when the user is indicated to be in the second time zone.

8. The method of claim 1, wherein a same period of time is displayed in the time zone sensitive calendar using both a first formatting and a second formatting.

9. The method of claim 1, wherein the travel duration indicator is divided into a number of segments equal to number of hours of actual travel time.

10. The method of claim 1, wherein the travel duration indicator includes a numeral equal to number of hours of actual travel time.

11. The method of claim 1, wherein a diagonal line is displayed on the time zone sensitive calendar in association with the virtual travel event to indicate a division between said different time zones.

12. A computer-readable storage medium having computer executable instructions stored thereon that, when executed by a computer, cause the computer to:
access user schedule information;
determine multiple time zones to include in a calendar view of the user schedule information for different time periods in the time zone sensitive calendar based on the user schedule information;
associate each time period in the calendar view with one of the multiple time zones;
associate each event during the time periods that ate displayed in the calendar view with the associated time zone;
add a travel duration indicator to the time zone sensitive calendar that indicates a compression of time or an expansion of time and indicates a duration of time that is associated with a travel event;
add a virtual travel event to the time zone sensitive calendar whe11 a location of an event appearing in the time zone sensitive calendar is in a different time zone than the preceding time zone in the time zone sensitive calendar but no user travel between time zones is scheduled;
determine a current time zone of a user that is associated with the time zone sensitive calendar by one or more of:
a smart phone or computing device associated with the user determines that the time zone has changed;
location information is derived from GPS (Global Positioning System) or other sensor information; and
current time zone information is entered manually;
automatically associate a current time period in the time zone sensitive calendar with the current time zone;
update the display of the time zone sensitive calendar to reflect the current time zone; and
display the calendar view for the time zone sensitive calendar such that time periods associated with different time zones ate visually distinct.

13. The computer-readable storage medium of claim 12, wherein displaying the calendar view for the time zone sensitive calendar such that time periods associated with different time zones are visually distinct comprises formatting each of the different time periods using at least one of a different color or a different fill pattern.

14. The computer-readable storage medium of claim 12, wherein determining the multiple time zones to include in the calendar view comprises determining a travel event from the information that starts in a first time zone and ends in a second time zone.

15. The computer-readable storage medium of claim 12, further comprising for each event that has a time within the calendar view determining a time zone to associate with each event.

16. A system for displaying a time zone sensitive calendar, comprising:

a display; and a processor and a computer-readable medium;

the processor configured to:

access user schedule information;

determine multiple time zones to include in a calendar view of the user schedule information for different time periods in the time zone sensitive calendar based on the user schedule information;

associate each time period in the calendar view with one of the multiple time zones;

associate each event during the time periods that are displayed in the calendar view with the associated time zone;

add a travel duration indicator to the time zone sensitive calendar that indicates a compression of time or an expansion of time and indicates a duration of time that is associated with a travel event;

add a virtual travel event to the time zone sensitive calendar when a location of an event appearing in the time zone sensitive calendar is in a different time zone than the preceding time zone in the time zone sensitive calendar but no user travel between time zones is scheduled;

determine a current time zone of a user that is associated with the time zone sensitive calendar by one or more of;

a smart phone or computing device associated with the user determines that the time zone has changed;

location information is derived from GPS (Global Positioning System) or other sensor information; and current time zone information is entered manually;

automatically associate a current time period in the time zone sensitive calendar with the current time zone;

update the display of the time zone sensitive calendar to reflect the current time zone; and display the calendar view for the time zone sensitive calendar such that time periods associated with different time zones are visually distinct.

17. The system of claim 16, wherein determining the multiple time zones to include in the calendar view comprises determining a travel event from the information that starts in a first time zone and ends in a second time zone.

* * * * *

UNITED STATES PATENT AND TRADEMARK OFFICE
CERTIFICATE OF CORRECTION

PATENT NO. : 10,096,002 B2
APPLICATION NO. : 14/252095
DATED : October 9, 2018
INVENTOR(S) : Barraci et al.

Page 1 of 1

It is certified that error appears in the above-identified patent and that said Letters Patent is hereby corrected as shown below:

At Column 12, Line 32, delete the word "whe11" and substitute therefore -- when --.
At Column 12, Line 50, delete the word "ate" and substitute therefore -- are --.

Signed and Sealed this
Fourth Day of December, 2018

Andrei Iancu
*Director of the United States Patent and Trademark Office*